United States Patent [19]

Breindl

[11] Patent Number: 4,976,660
[45] Date of Patent: Dec. 11, 1990

[54] APPARATUS FOR TENSIONING V-BELTS, ESPECIALLY FOR AUTOMOTIVE VEHICLES

[75] Inventor: Werner Breindl, Unterschleissheim, Fed. Rep. of Germany

[73] Assignee: Ina Walzlager Schaeffler KG, Herzogenaurach, Fed. Rep. of Germany

[21] Appl. No.: 346,943

[22] PCT Filed: Aug. 1, 1988

[86] PCT No.: PCT/EP88/00696
§ 371 Date: May 30, 1989
§ 102(e) Date: May 30, 1989

[87] PCT Pub. No.: WO89/01098
PCT Pub. Date: Feb. 9, 1989

[30] Foreign Application Priority Data

Jul. 31, 1987 [DE] Fed. Rep. of Germany ... 8710548[U]

[51] Int. Cl.$^5$ ............................................. F16H 7/12
[52] U.S. Cl. ..................... 474/135; 474/110; 474/138
[58] Field of Search .................. 474/101, 109–111, 474/113–117, 133–135, 136, 138

[56] References Cited

U.S. PATENT DOCUMENTS

| | | | |
|---|---|---|---|
| 4,539,001 | 9/1985 | Okabe | 474/138 |
| 4,657,524 | 4/1987 | Okabe | 474/110 |
| 4,790,801 | 12/1988 | Schmidt et al. | 474/110 |

FOREIGN PATENT DOCUMENTS

| | | |
|---|---|---|
| 0243237 | 10/1987 | European Pat. Off. |
| D7510 | 5/1952 | Fed. Rep. of Germany . |
| 1550992 | 3/1966 | Fed. Rep. of Germany . |
| 1550905 | 10/1966 | Fed. Rep. of Germany . |
| 2008472 | 2/1970 | Fed. Rep. of Germany . |
| 2617368 | 4/1976 | Fed. Rep. of Germany . |
| 3211095 | 3/1982 | Fed. Rep. of Germany . |
| 3208184 | 6/1982 | Fed. Rep. of Germany . |
| 3637409 | 3/1986 | Fed. Rep. of Germany . |
| 3630844 | 10/1986 | Fed. Rep. of Germany . |
| 2350518 | 3/1976 | France . |

Primary Examiner—Thuy M. Bui
Attorney, Agent, or Firm—Fleit, Jacobson, Cohn, Price, Holman & Stern

[57] ABSTRACT

An apparatus is proposed for tensioning V-belts, especially for automotive vehicles, said apparatus comprising a length-variable link member (6) for tensioning a pulley against the V-belt. The link member comprises a casing (10) carrying a connection bearing (9), and a piston rod (8) guided within the casing and carrying a further connection bearing (7), and a helical compression spring (18) fixed between a spring rest (19) of the casing and a spring rest (20) of the piston rod. Automatic compensation of variations in the effective length of the V-belt loop without any belt vibrations or fluttering at higher rotational speeds is achieved by the feature that from the bottom of the casing (10) there extends an upright cylinder (14) which comprises and guides a piston portion (13) of the piston rod with a clearance permitting leakage flow of pressurized liquid, the pressurized liquid-filled cylinder space (16) of said cylinder being communicated, on the one hand, with a casing interior space (17) between the piston rod or the cylinder comprising the same, respectively, and on the other hand with the casing surface via a system of passageways (26, 27, 28) having a check valve (29) disposed therein.

5 Claims, 2 Drawing Sheets

APPARATUS FOR TENSIONING V-BELTS, ESPECIALLY FOR AUTOMOTIVE VEHICLES

CROSS REFERENCE TO RELATED APPLICATION(S)

This U.S. application stems from PCT International Application No. PCT/EP88/00696 filed Aug. 1, 1988.

BACKGROUND OF THE INVENTION

1. Field of the Invention

This innovation is concerned with an apparatus for tensioning V-belts, especially for automotive vehicles, comprising a link member of variable length which engages a movable support of a pulley and is supported by a stationary abutment, said link member comprising a casing carrying a connection bearing, a piston rod guided within the casing and carrying a further connection bearing, and a helical compression spring anchored between a spring rest of the casing and a spring rest of the piston rod.

2. Description of Related Art

Known apparatus of the specified kind effect a length adjustment of the V-belt loop which is insufficient to prevent fluttering of the belt at high rotational speeds when there occur differences in length of the V-belt due to aging or due to the action of heat or hooking up of auxiliary means driven by the V-belt.

SUMMARY OF THE INVENTION

In respect thereto this innovation is intended to design an apparatus for tensioning V-belts in such a way that an automatic compensation of variations of the effective length of the V-belt loop becomes possible while fluttering will not occur at high rotational speeds.

With an apparatus of the kind briefly described above, the specified object is achieved in accordance with this innovation in that, with reference to the operative position, there extends from the bottom of the casing a cylinder which includes and guides a piston portion of the piston rod with a clearance that permits a leakage flow of pressurized liquid, the pressurized liquid-filled cylinder space of said cylinder being communicated on the one hand with a casing interior between the piston rod or the cylinder comprising the same, respectively, and being communicated on the other hand with the casing surface via a system of passageways which includes a spring-biased check valve for blocking the pressurized liquid flow form the cylinder space.

Thus, the pressurized liquid filled into the cylinder space constitutes a support for the piston rod relative to the casing, while irrespective of the action of the check valve and the incompressibility of the liquid content said support is not rigid but is of variable volume due to the possible leakage flow of pressurized liquid via the specified clearance, wherein it is possible rapidly to make up the pressurized liquid content of the mentioned cylinder due to the action of the check valve in the sense of increasing the effective length of the link member and to reduce it more slowly in the sense of shortening the link member due to the leakage flow of pressurized liquid on account of the specified clearance. Moreover, a flow of pressurized liquid via the check valve allows damping of the length-varying movement of the link member for effectively damping any belt vibrations or flutter.

Advantageous configurations of the apparatus in accordance with the innovation are characterized in the claims 2 to 5, the content of which is expressly made part of the specification without a repetition of the wording thereof.

BRIEF DESCRIPTION OF THE DRAWING

Below, a preferred embodiment will be explained with reference to the drawing, in which.

DESCRIPTION OF THE PREFERRED EMBODIMENT

Figure 1:
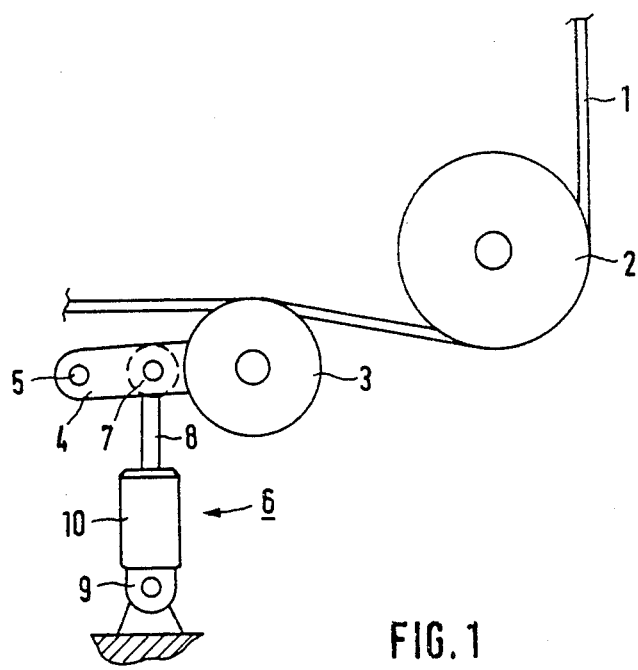
FIG. 1 is a schematic view for explaining the mode of operation of an apparatus for tensioning V-belts.

FIG. 1 illustrates a portion of a V-belt 1 which is trained over a pulley 2 of a drive mechanism or of a driven part and over an idling pulley 3. The pulley 3 is fixed to the casing at 5 via a link 4 and is adapted to be biased towards the V-belt 1 by means of a variable-length link member 6 so as to maintain the V-belt under tension. The link member 6 comprises a piston rod 8 connected via a connection bearing 7 to the link member 4 and a casing 10 connected via a connection bearing 9 to a portion of a frame structure.

The piston rod 8 is formed with a groove 11 having a split spring washer 12 fitted therein. The lower part of the piston rod 8 (as viewed with reference to the illustration of FIG. 2) beneath the spring washer 12 constitutes a piston portion 13 projecting into a cylinder 14 which extends coaxially from the bottom of the interior space of the casing 10. The piston portion 13 is guided within the cylinder 14 as indicated at 15—this is not shown in detail in the drawing—with such a clearance that due to said clearance a leakage flow of pressurized liquid from a pressurized liquid content provided in the cylinder interior 16 is made possible.

Between the piston rod or the outer surface of the cylinder 14, on the one hand, and the outer surface of the casing 10, on the other hand, there is defined a casing interior space 17 serving as a spring housing for a helical compression spring 18. The helical compression spring 18 rests with its one end against a casing-side spring rest 19 formed within the casing interior space 17 and with its other end against a spring rest 20 defined by an annulus guided on the piston portion 13 and having a groove which opens in axial direction towards the casing interior space 17. The spring rest 20 transmits to the piston rod 8 the biasing force of the helical compression spring 18 via the spring washer 12 and the groove 11 of the piston rod 8.

The piston rod 8 and the connection bearing 7 provided at the end thereof are retained within the casing 10 by means of a casing lid 21, the casing lid 21 being provided with a scraper seal 22 engaging the piston rod 8 and with a flange 23 extending radially towards the piston rod, said flange cooperating with the spring washer 12 acting as an abutment. The casing lid 21 is secured in the open top of the casing as shown by crimping of the casing surface with a sealing ring 24 fitted therebetween in a circumferential groove of the casing lid.

Figure 2:
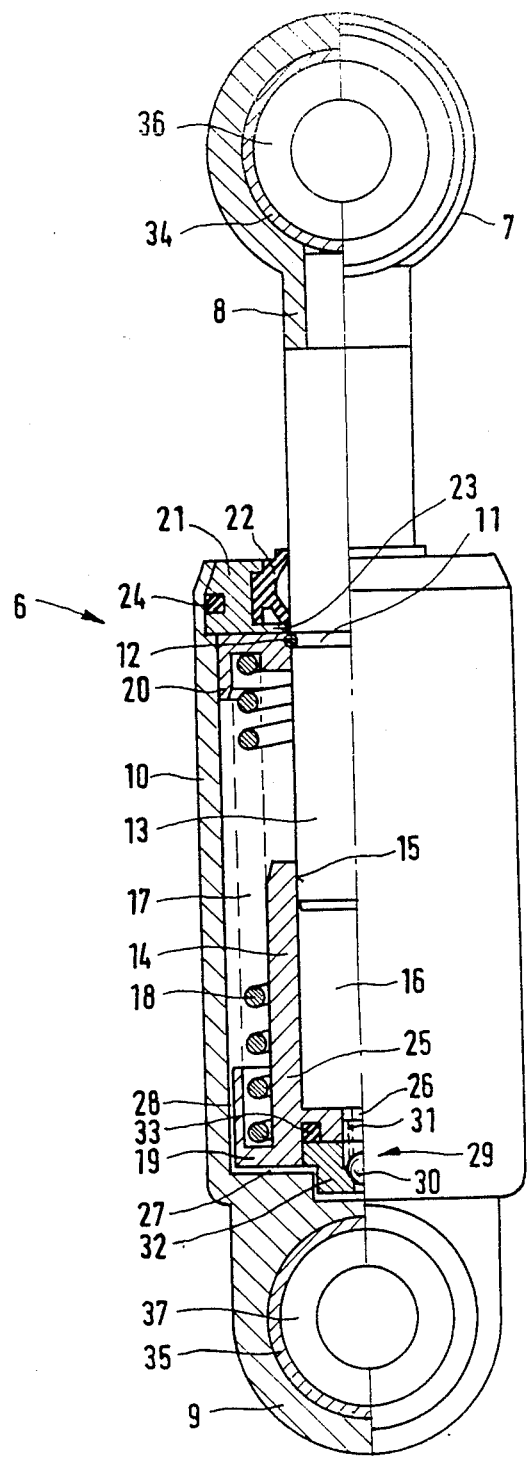
FIG. 2 is a partially sectional side view of a link member of the apparatus illustrated in FIG. 1.

It will be apparent from FIG. 2 that the spring rest 19 and the cylinder 14 are formed on a casing insert 25 which is a close sliding fit in the interior of the casing 10. The casing insert 25 comprises an axial passageway 26 opening from the center of the insert bottom from the cylinder space 16, radial passageways 27 extending between the outer end face of the insert and the bottom of the casing interior space, and axial passageways 28 extending between the outer surface of the spring rest 19 and the inner wall of the casing interior space, so that the passageway system constituted by the passageways 26, 27, 28 communicates the cylinder interior 16 and the casing interior space or the spring case 17 with each other.

Within the passageway system there is disposed a check valve 29 including a valve ball 30 which is urged by a spring 31 against a valve seat formed in a valve body 32. The valve body 32 is in its turn fitted in the bottom of the casing insert 25 with a sealing ring 33 interposed therebetween. Thus the check valve 29 permits, via the passageway system including the passageways 26, 27 and 28, only a flow of pressurized liquid from the casing interior space 17 into the cylinder interior 16, while any reverse flow is blocked.

Finally, it should be noted that the connection bearings 7 and 9 of the piston rod 8 and the casing 10 each comprise a flange bushing 34 and 35 fitted in a bore of the bearing rest and a bearing bush 36 and 37 fitted in the bore of the former, respectively.

Though the present specification assumes a vertical position of the link member 6, the presently described design readily permits an inclined position for instance at an angle of 45°, the liquid content in the cylinder interior 16 and the casing interior being sufficient to continually keep the cylinder interior 16 filled with liquid and to provide in the casing interior 17 a sufficient volume of air for compensating any liquid displaced by the piston rod within the cylinder 14 and discharged on account of the clearance at 15.

The liquid content of the link member 6 in cooperation with the leakage flow passage on account of the clearance at 15 and of the check valve 29 exhibits a shock absorbing effect for effectively suppressing any vibrations of the V-belt 1.

I claim:

1. Apparatus for tensioning V-belts, especially for automotive vehicles, comprising a link member (6) of variable length which engages a movable support (4) of a pulley (3) and is supported by a stationary abutment, said link member comprising a casing (10) carrying a connection bearing (9), a piston rod, (8) guided within the casing and carrying a further connection bearing (7), and a helical compression spring (18) anchored between a spring rest (19) of the casing and a spring rest (20) of the piston rod, characterized in that, with reference to the operative position, there extends from the bottom of the casing (10) a cylinder (14) with a clearance (15) that permits a leakage flow of pressurized liquid, said cylinder defining a pressurized liquid-filled cylinder space (16) communicated on the one hand with a casing interior (17) between the piston rod or the cylinder comprising the same, respectively, and being communicated on the other hand with the casing surface of the casing via a system of passageways (26, 27, 28) which includes a spring-biased check valve (29) for blocking the flow of pressurized liquid from the cylinder space (16).

2. Apparatus as claimed in claim 1, characterized in that the casing interior space (17) defines a spring chamber for the helical compression spring (18) which is wound around the cylinder (14) standing up from the casing bottom and which extends to the spring rest (20) of the piston rod (8) guided within the casing (10).

3. Apparatus as claimed in claim 2, characterized in that the spring rest (20) of the piston rod (8) is movably guided thereon and bears against a spring washer (12) fitted in a groove (11) in the piston rod.

4. Apparatus as claimed in claim 3, characterized in that the piston rod (8) is retained within the casing (10) by a casing lid (21) which comprises a scraper seal (22) encompassing the piston rod and a radial flange (23) for cooperation with the spring washer (12) to form an abutment.

5. Apparatus as claimed in claim 1, characterized in that the passageway system (26, 27, 28) opens from the bottom of the cylinder space (16) and extends radially outwardly at the end face of a casing insert (25), which constitutes the cylinder (14) and the casing-side spring rest (19), and further extends axially towards the casing interior space (17) between the casing insert and the outer surface of the casing.

* * * * *